(12) United States Patent
Cho et al.

(10) Patent No.: US 8,594,032 B2
(45) Date of Patent: Nov. 26, 2013

(54) METHOD FOR MAPPING RANGING CHANNELS AND OPPORTUNITIES IN A BROADBAND WIRELESS ACCESS SYSTEM

(75) Inventors: Hee Jeong Cho, Anyang-si (KR); Ki Seon Ryu, Anyang-si (KR); Jin Sam Kwak, Anyang-si (KR); Gi Won Park, Anyang-si (KR); Yong Ho Kim, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 12/909,524

(22) Filed: Oct. 21, 2010

(65) Prior Publication Data

US 2011/0103325 A1    May 5, 2011

Related U.S. Application Data

(60) Provisional application No. 61/253,822, filed on Oct. 21, 2009, provisional application No. 61/257,848, filed on Nov. 4, 2009, provisional application No. 61/258,216, filed on Nov. 5, 2009, provisional application No. 61/266,161, filed on Dec. 3, 2009, provisional application No. 61/287,196, filed on Dec. 17, 2009, provisional application No. 61/328,643, filed on Apr. 28, 2010.

(30) Foreign Application Priority Data

Sep. 20, 2010  (KR) .................. 10-2010-0092492

(51) Int. Cl.
*H04W 4/00* (2009.01)
(52) U.S. Cl.
USPC ........................................ 370/329

(58) Field of Classification Search
None
See application file for complete search history.

(56) References Cited

U.S. PATENT DOCUMENTS

| | | | |
|---|---|---|---|
| 2005/0195791 A1* | 9/2005 | Sung et al. | 370/342 |
| 2006/0083160 A1* | 4/2006 | Koo et al. | 370/208 |
| 2006/0209734 A1 | 9/2006 | Son et al. | |
| 2007/0202882 A1 | 8/2007 | Ju et al. | |
| 2008/0298315 A1 | 12/2008 | Ihm et al. | |
| 2010/0150100 A1* | 6/2010 | Chen et al. | 370/330 |

FOREIGN PATENT DOCUMENTS

KR   10-2009-0045853 A   8/2009

OTHER PUBLICATIONS

PCT International Search Report (Application No. PCT/KR2010/007233) dated Jun. 24, 2011.

* cited by examiner

*Primary Examiner* — Chi Pham
*Assistant Examiner* — Kouroush Mohebbi
(74) *Attorney, Agent, or Firm* — Birch, Stewart, Kolasch & Birch, LLP

(57) ABSTRACT

A method for efficiently updating system information of a base station at a relay station of a broadband wireless access system and an apparatus for performing the method are disclosed. The method for updating system information of an advanced base station (ABS) at an advanced relay station (ARS) of a broadband wireless access system comprises receiving a first message, which includes changed information of the system information of the base station, from the base station; transmitting a second message for acknowledgment of the first message to the base station; and performing application for the changed information.

13 Claims, 15 Drawing Sheets

METHOD FOR MAPPING RANGING CHANNELS AND OPPORTUNITIES IN A BROADBAND WIRELESS ACCESS SYSTEM

This application claims the benefit of the Korean Patent Application No. 10-2010-0092492, filed on Sep. 20, 2010, which is hereby incorporated by reference as if fully set forth herein.

This application also claims the benefit of U.S. Provisional Application Ser. Nos. 61/253,822, filed on Oct. 21, 2009, 61/257,848, filed on Nov. 4, 2009, 61/258,216, filed on Nov. 5, 2009, 61/266,161, filed on Dec. 3, 2009, 61/287,196, filed on Dec. 17, 2009 and 61/328,643, filed on Apr. 28, 2010, the contents of which are hereby incorporated by reference in their entirety.

BACKGROUND OF THE INVENTION

1. Field of the Invention

The present invention relates to a broadband wireless access system, and more particularly, to a method of mapping ranging channels corresponding to uplink zones where a mobile station performs ranging and ranging opportunities, and a method for performing ranging in a mobile station and an apparatus for performing the method.

2. Discussion of the Related Art

The main standard defined by the IEEE 802.16 task group includes IEEE 802.16-2004 called fixed WiMAX and IEEE 802.16e-2005 (16e) called mobile WiMAX. The IEEE 802.16e-2005 has been finally approved from the IEEE on December of 2005. The standard based on mobile WiMAX of a current version includes IEEE 802.16-2004, IEEE 802.16e-2005 (this document includes Corrigenda of IEEE 802.16-2004), and IEEE 802.16-2004/Corrigenda2/D8. Currently, standardization of IEEE 802.16m (16m) for mobile WiMAX of next version is in progress by TGm within the IEEE 802.16 task group.

Initial ranging means a procedure of controlling transmission parameters (frequency offset, time offset, transmission power) for uplink communication between a mobile station and a base station during an initial network registration. After performing the network registration procedure, the mobile station performs periodic ranging to continue to maintain uplink communication with the base station. In addition, examples of ranging include handover ranging for simplifying a procedure during a handover operation of a mobile station and bandwidth request ranging performed during an uplink bandwidth request procedure when a mobile station desires to transmit data.

In a broadband wireless access system, a CDMA code (or ranging preamble) set that can be used for ranging depending on ranging types and a region for transmitting CDMA codes are allocated through a channel (for example, UL-MAP), which broadcasts system information, by a network. Accordingly, to perform handover ranging, a specific mobile station selects a specific code from CDMA codes for handover ranging and transmits the selected code to the network through initial ranging and handover ranging regions to request ranging. In this case, the network can identity a type of ranging through the received CDMA code and an interval where the CDMA code is transmitted.

In the IEEE802.16m system, examples of a ranging channel include a synchronized ranging channel (S-RCH) for ranging performed by a synchronized mobile station and a non-synchronized ranging channel (NS-RCH) for ranging performed by a non-synchronized mobile station. Also, a bandwidth request channel exists in the IEEE802.16m system to request an uplink band when a mobile station desires to transmit data. The ranging channels (S-RCH and NS-RCH) and the bandwidth request channel (BRCH) are used to mean ranging opportunity and BR opportunity, respectively.

The ranging opportunity is used for a ranging acknowledgement response (AAI_RNG-ACK) message for notifying a mobile station whether a base station has received a ranging code received during a ranging procedure, and a CDMA allocation map information element (CDMA Allocation A-MAP IE) for transferring resource allocation information for the successfully received ranging code to a mobile station that has transmitted the corresponding code.

At this time, different types of base stations transmit ranging channels and code allocation information in accordance with their respective manners. For example, a base station that supports WirelessMAN-OFDMA with FDM-based UL PUSC zone and a base station having narrow coverage, such as a femto cell, transfer ranging related information to the mobile station through a super frame header (SFH) which is an independent channel type. The other base stations (e.g., macro base station, relay station, and macro hot-zone) transfers different kinds of ranging related information to the mobile station through a super frame header (SFH) and a system configuration descriptor (AAI_SCD) message, wherein the SFH is an independent channel type and the system configuration descriptor message is a media access control (MAC) message type. The ranging channels and the code allocation information are transferred to the mobile stations at different times when the SFH and the system configuration descriptor (AAI_SCD) message are used at the same time.

In this case, the mobile station may perform initial ranging or handover ranging after receiving the SFH only even though it does not receive the AAI_SCD message. However, if the ranging channel allocated through the AAI_SCD message is first allocated on time axis and frequency axis, the mobile station that has not received the AAI_SCD message does not know the presence of the ranging channel.

For example, if the physical location of the ranging channel transferred through the AAI_SCD message is prior to that of the ranging channel transferred through the SFH on the time axis/frequency axis in one frame, the ranging channel of the AAI_SCD message is mapped into ranging opportunity index 0, and the ranging channel of the SFH is mapped into ranging opportunity index 1. At this time, although the ranging channel selected by the mobile station for initial ranging or handover ranging has actually ranging opportunity index of 1, since the mobile station has not received the AAI_SCD message, a problem may occur in that the mobile station recognizes the corresponding ranging channel as ranging opportunity index of 0.

Accordingly, a mapping rule of opportunity index of the ranging channel on the time axis/frequency axis as described above is not desirably required. A method of mapping physically allocated ranging channels into ranging opportunity should be defined newly.

SUMMARY OF THE INVENTION

Accordingly, the present invention is directed to a method of mapping ranging channels and ranging opportunities in a broadband wireless access system, which substantially obviates one or more problems due to limitations and disadvantages of the related art.

An object of the present invention is to provide a method of mapping opportunity index of a ranging channel more efficiently.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing ranging at a mobile station in a broadband wireless access system comprises the steps of receiving allocation information of at least one first ranging channel allocated to a specific frame, from a base station; and determining opportunity index of the first ranging channel by using the allocation information, wherein, if the first ranging channel is a non-synchronized ranging channel (NS-RCH), the step of determining opportunity index of the first ranging channel is performed to determine opportunity index of the non-synchronized ranging channel as an initial value of an opportunity index range which is previously set, and if the first ranging channel is a synchronized ranging channel (S-RCH), the step of determining opportunity index of the first ranging channel is performed to determine opportunity index of the synchronized ranging channel as the last value of the opportunity index range.

In this case, the method further comprises the steps of receiving allocation information of at least one second ranging channel, which is dynamically allocated, from a base station; and determining opportunity index of the second ranging channel, wherein the step of determining opportunity index of the second ranging channel is performed to determine opportunity index of the second ranging channel in due order depending on allocation location of the allocation information of the second ranging channel on a time domain in an opportunity index range except for a value of opportunity index based on the determined result of the opportunity index of the first ranging channel.

Also, the method further comprises the steps of transmitting a ranging code to the base station through the at least one ranging channel; and determining a received result of the ranging code by using opportunity index of the ranging channel, through which the ranging code has been transmitted, and a ranging acknowledgement (AAI_RNG-ACK) message received from the base station.

Also, the opportunity index of the non-synchronized ranging channel is 0b00, and the opportunity index of the synchronized ranging channel is 0b11.

Moreover, the allocation information of the at least one first ranging channel is received through a super frame header (SFH) if the first ranging channel is the non-synchronized ranging channel and received through the super frame header or a system configuration descriptor (AAI_SCD) message if the first ranging channel is the synchronized ranging channel, and the allocation information of the at least second ranging channel is received through a map (A-MAP) or handover command (AAI_HO-CMD) message.

In another aspect of the present invention, a method for performing ranging at a base station in a broadband wireless access system comprises the steps of transmitting allocation information of at least one of at least one first ranging channel allocated to a specific frame and at least one second ranging channel dynamically allocated, to a mobile station; receiving a ranging code from the mobile station through any one of the first ranging channel and the second ranging channel; and transmitting a ranging acknowledgement (AAI_RNG-ACK) message, which includes ranging status of the ranging code and opportunity index indicating the ranging channel through which the ranging code has been received, to the mobile station, wherein the opportunity index indicating the ranging channel through which the ranging code has been received is determined in due order depending on allocation of the at least one second ranging channel on a time domain from a type of the first ranging channel and the allocation information of the second ranging channel.

In this case, the opportunity index indicating the ranging channel through which the ranging code has been received is mapped into an initial value of an opportunity index ranging which is previously set, if the ranging channel through which the ranging code has been received is a non-synchronized ranging channel of the first ranging channel, mapped into the last value of the opportunity index if the ranging channel through which the ranging code has been received is a synchronized ranging channel, and mapped in due order depending on allocation location of the at least one second ranging channel on the time domain in an opportunity index ranging except for a value of opportunity index mapped into the first ranging channel if the ranging channel through which the ranging code has been received is the at least one second ranging channel.

Also, the opportunity index of the non-synchronized ranging channel is 0b00, and the opportunity index of the synchronized ranging channel is 0b11.

Moreover, the allocation information of the at least one first ranging channel is transmitted through a super frame header (SFH) if the first ranging channel is the non-synchronized ranging channel and transmitted through the super frame header or a system configuration descriptor (AAI_SCD) message if the first ranging channel is the synchronized ranging channel, and the allocation information of the at least second ranging channel is transmitted through a map (A-MAP) or handover command (AAI_HO-CMD) message.

In other aspect of the present invention, a mobile station that performs a ranging procedure in a broadband wireless access system comprises a processor; and a radio frequency (RF) module transmitting and receiving a radio signal to and from the outside under the control of the processor, wherein, if allocation information of the at least one first ranging channel allocated to a specific frame is received from a base station, the processor determines opportunity index of the at least one first ranging channel by using the allocation information, and if the at least one first ranging channel is a non-synchronized ranging channel (NS-RCH), the processor determines opportunity index of the non-synchronized ranging channel as an initial value of an opportunity index range which is previously set, and if the first ranging channel is a synchronized ranging channel (S-RCH), the processor determines opportunity index of the synchronized ranging channel as the last value of the opportunity index range.

At this time, the processor determines opportunity index of the at least one second ranging channel if allocation information of the at least second ranging channel, which is dynamically is allocated, is received from the base station, and determines the opportunity index of the second ranging channel in due order depending on allocation location of the allocation information of the second ranging channel on a time domain in an opportunity index range except for a value of opportunity index based on the determined result of the opportunity index of the first ranging channel.

Also, the processor transmits a ranging code to the base station through the at least one ranging channel, and determines a received result of the ranging code by using opportunity index of the ranging channel, through which the ranging code has been transmitted, and a ranging acknowledgement (AAI_RNG-ACK) message received from the base station.

Also, the opportunity index of the non-synchronized ranging channel is 0b00, and the opportunity index of the synchronized ranging channel is 0b11.

Moreover, the allocation information of the at least one first ranging channel is received through a super frame header (SFH) if the first ranging channel is the non-synchronized ranging channel and received through the super frame header or a system configuration descriptor (AAI_SCD) message if the first ranging channel is the synchronized ranging channel, and the allocation information of the at least second ranging channel is received through a map (A-MAP) or handover command (AAI_HO-CMD) message.

According to the embodiments of the present invention, a mapping rule of the ranging channels and opportunity indexes is defined efficiently, whereby the mobile station can exactly recognize the opportunity indexes of the ranging channels regardless of a channel through which information on the ranging channels is transferred.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
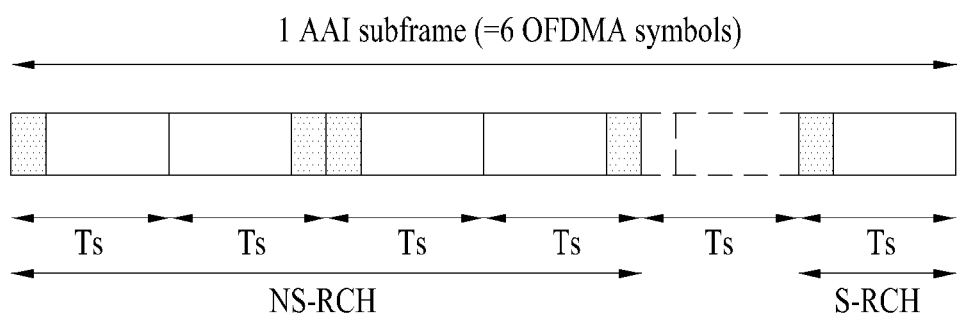
FIG. 1 is a diagram illustrating a structure of ranging channels in an IEEE 802.16m system that supports a legacy system.

Reference will now be made in detail to the preferred embodiments of the present invention, examples of which are illustrated in the accompanying drawings. Wherever possible, the same reference numbers will be used throughout the drawings to refer to the same or like parts.

The present invention relates to a wireless access system. Hereinafter, the embodiments of the present invention disclose methods of efficiently mapping ranging channels and ranging opportunities and an apparatus for performing the methods.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The terminology, 'base station (BS)' may be replaced with terminologies such as a fixed station, Node B, eNode B (eNB), an access point (AP), and an advanced BS (ABS). Also, the terminology, 'terminal' may be replaced with terminologies such as a mobile station (UE), a mobile station (MS), a mobile subscriber station (MSS), an advanced MS (AMS), and a mobile terminal (MT).

The embodiments according to the present invention can be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents. Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16Rev2, and IEEE P802.16m.

Specific terminologies hereinafter used in the embodiments of the present invention are provided to assist understanding of the present invention, and various modifications can be made in the specific terminologies within the range that they do not depart from technical spirits of the present invention.

If a base station receives CDMA ranging codes for ranging from a mobile station, the base station transmits AAI_RNG-ACK message to the mobile station to notify the mobile station whether the base station has successfully received the ranging codes and also notify the mobile station of the received status of the ranging codes and a physical correction value. In more detail, if the base station receives ranging codes from the mobile station, it transmits allocation information of the AAI_RNG-ACK message to the mobile station through broadcast assignment map information element (A-MAP IE) based on a broadcast masking code in response to the received ranging codes. If the AAI_RNG-ACK message is transmitted to a specific mobile station in an unsolicited manner, allocation information is transmitted to the mobile station through a downlink basic assignment A-MAP IE based on unicast STID. If all ranging codes are successfully received or in case of a specific condition, transmission of the AAI_RNG-ACK message may be omitted.

Hereinafter, configuration of ranging channels for each of base stations will be described.

1) Base Station that Supports a Legacy System

First of all, an advanced base station (ABS) that supports the IEEE802.16m system and its legacy system (for example, IEEE 802.16e system) at the same time will be described with reference to FIG. 1.

FIG. 1 is a diagram illustrating a structure of ranging channels in an IEEE 802.16m system that supports a legacy system.

In the IEEE 802.16m system that supports a legacy system, if an uplink region for a legacy mobile station and an uplink region for an IEEE 802.16m mobile station are divided from each other in accordance with a FDM mode, permutation of these physical regions should have a partial usage subchannel (PUSC) structure used in the legacy system. Accordingly, the IEE 802.16m system that supports a legacy system has a ranging channel structure different from that in a general IEEE 802.16m system that supports an IEEE 802.16m mobile station only. In this case, it is preferable that NS-RCH and S-RCH exist together in one subframe as illustrated in FIG. 1.

In the base station of the IEEE 802.16m system that supports a legacy system, ranging channels and code allocation information are basically transmitted to the mobile station through the SFH SP1 (RP code partition information for the RCH, allocation periodicity of the RCH, subframe offset of the RCH, etc.). One NS-RCH and one S-RCH (ranging opportunity) exist per frame depending on the allocation mode transmitted through the SFH. This type base station will be referred to as "type 1 base station" hereinafter.

2) Base Station Having Narrow Coverage

Next, a base station having narrow coverage, such as a femto base station, will be described.

In the femto base station, ranging channels and code allocation information are basically transmitted through the SFH SP1 (RP code partition information for the S-RCH, allocation periodicity of the S-RCH, subframe offset of the S-RCH, etc.). One synchronized ranging channel (i.e., ranging opportunity) exists per frame depending on the allocation mode transmitted through the SFH. However, since non-synchronization rarely occurs in the base station having narrow coverage such as a femto base station, the synchronized ranging channel (S-RCH) can be used only without the non-synchronized ranging channel (NS-RCH). This type base station will be referred to as "type 2 base station" hereinafter.

3) Other Base Stations

Finally, the other type base stations (for example, 16m only ABS, ARS, macro hot-zone, etc.) not the base station having narrow coverage or the base station that supports a legacy system will be described.

In the other type base stations, ranging channels and allocation information are basically transmitted through the SFH SP1 (RP code partition information for the NS-RCH, allocation periodicity of the NS-RCH, subframe offset of the NS-RCH, etc.). One non-synchronized ranging channel (i.e., ranging opportunity) exists per frame depending on the allocation mode transmitted through the SFH. Also, in addition to the SFH, the ranging channel information may additionally be transmitted through a map (A-MAP) or AAI-SCD message.

In other words, if the map is used, allocation information of the non-synchronization channel (NS-RCH) for handover ranging can be transmitted to the mobile station through broadcast assignment A-MAP IE or handover command message (AAI_HO-CMD) depending on a scheduling decision of the base station in subframes other than the subframe used for allocation of general random broadcast data. Also, if the AAI_SCD message is used, it includes information such as periodicityOfRngChSync and rangingPreambleCodeSync.

One synchronized ranging channel (ranging opportunity) exists per frame depending on the allocation mode. This type base station will be referred to as "type 3 base station" hereinafter.

In the aforementioned three-type base stations, if a mapping rule of determining opportunity index of general ranging channels in the order of time/frequency domains is used for transmission of ranging channels and code allocation information, a problem occurs in that ranging opportunity index determined by the mobile station may be different from the actual ranging opportunity index depending on the transmission mode of the allocation information.

In order to solve this problem, the present invention suggests new mapping rules for mapping opportunity index into ranging channels, as follows.

First Embodiment

According to one embodiment of the present invention, a method for mapping ranging channels into a fixed value of opportunity index depending on a transmission type of ranging channel allocation information and a type of the ranging channels will be provided.

According to an example of a mapping rule of the present invention, opportunity index of NS-RCH allocated through the SFH is given the first value (e.g., '0') or the last value (e.g., '3', if 2 bits are configured). Also, opportunity index of S-RCH allocated through the SFH or the AAI_SCD message is given the last value (e.g., '3' if 2 bits are configured) or the first value '0'.

At this time, if the opportunity index of the NS-RCH is defined by the first value, the opportunity index of the S-RCH should be defined by the last value. In other words, it is preferable that the opportunity index of the NS-RCH does not overlap the opportunity index of the S-RCH.

Opportunity indexes of the channels for handover ranging, which are additionally allocated through the map (A-MAP), are given by intermediate values (i.e., remaining index values) of the opportunity indexes allocated for the NS-RCH and the S-RCH, in due order in the order of time axis and frequency axis.

An example that the aforementioned mapping rule of opportunity index according to the embodiment of the present invention is applied to the type 3 base station (i.e., base stations except for the base station that supports WirelessMAN-OFDMA with FDM based UL PUSC zone and the base station having narrow coverage such as femto cell) will be described with reference to FIG. 2.

Figure 2:
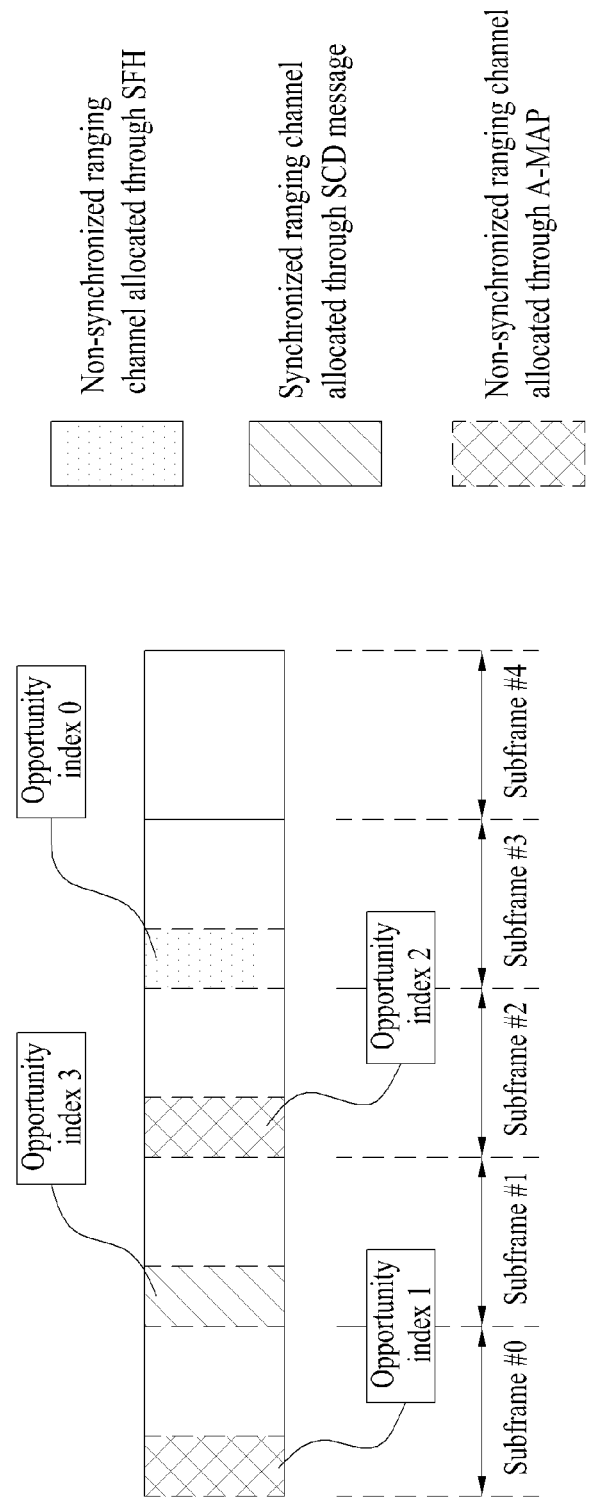
FIG. 2 is a diagram illustrating an example of a mapping rule for mapping ranging channels into opportunity indexes in accordance with one embodiment of the present invention.

FIG. 2 is a diagram illustrating an example of a mapping rule for mapping ranging channels into opportunity indexes in accordance with one embodiment of the present invention.

In FIG. 2, it is assumed that a downlink/uplink (DL/UL) ratio is 3:5 and ranging opportunity index has a size of 2 bits (i.e., four of 0~3). Also, it is assumed that the first value (i.e., 0) of the opportunity index is given to the NS-RCH. Moreover, it is assumed that maximum one ranging channel exists in one subframe.

Referring to FIG. 2, one ranging channel is allocated to each of the subframes #0 to #3. At this time, the non-synchronized ranging channel (NS-RCH) transmitted through the SFH is located at the subframe #3. As the mapping rule according to this embodiment is applied to the corresponding base station, even though the corresponding ranging channel is not located at first on the time axis, the ranging opportunity index becomes 0.

Next, the synchronized ranging channel (S-RCH) transmitted through the AAI_SCD message is located at the subframe #1 but is given the last index 3 in accordance with the mapping rule according to this embodiment.

As a result, the remaining opportunity indexes are 1 and 2, and the indexes of the NS-RCHs allocated through the A-MAP are given in such a manner that the index 1 is given to the ranging channel of the subframe #0 and the index 2 is given to the ranging channel of the subframe #2 in the order on the time axis.

Application to Type 3 Base Station

Other examples that the mapping rule according to this embodiment is applied to the type 3 base station will be described with reference to FIG. 3 to FIG. 6.

Figure 3:
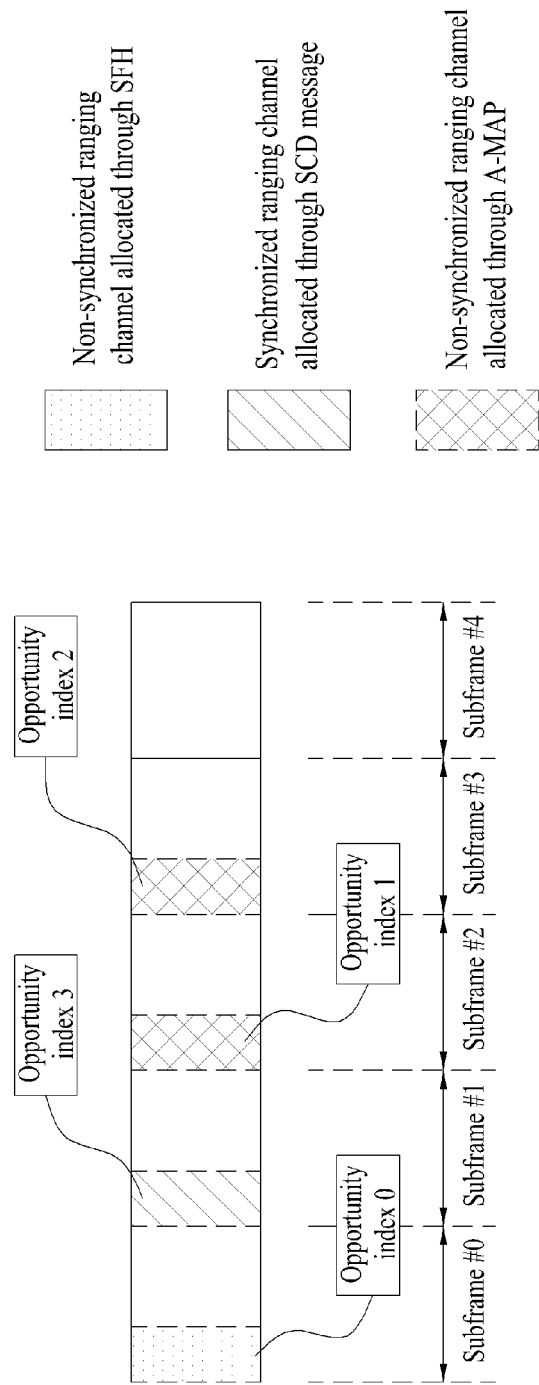
FIG. 3 is a diagram illustrating another example of a mapping rule for mapping ranging channels into opportunity indexes in accordance with one embodiment of the present invention.

FIG. 3 is a diagram illustrating another example of a mapping rule for mapping ranging channels into opportunity indexes in accordance with one embodiment of the present invention.

In FIG. 3, it is assumed that a downlink/uplink (DL/UL) ratio is 3:5 and ranging opportunity index has a size of 2 bits (i.e., four of 0~3). Also, it is assumed that the first value (i.e., 0) of the opportunity index is given to the NS-RCH. Moreover, it is assumed that maximum one ranging channel exists in one subframe.

Referring to FIG. 3, one ranging channel is allocated to each of the subframes #0 to #3. At this time, the non-synchronized ranging channel (NS-RCH) allocated through the SFH is located at the subframe #0. As the mapping rule according to this embodiment is applied to the corresponding base station, regardless that the corresponding ranging channel is located at first on the time axis, the ranging opportunity index becomes 0.

Next, the synchronized ranging channel (S-RCH) allocated through the AAI_SCD message is located at the subframe #1 but is given the last index 3 in accordance with the mapping rule according to this embodiment.

As a result, the remaining opportunity indexes are 1 and 2, and the indexes of the NS-RCHs allocated through the A-MAP are given in such a manner that the index 1 is given to the ranging channel of the subframe #2 and the index 2 is given to the ranging channel of the subframe #3 in the order on the time axis.

Another example that the mapping rule according to this embodiment is applied to the type 3 base station will be described with reference to FIG. 4.

Figure 4:
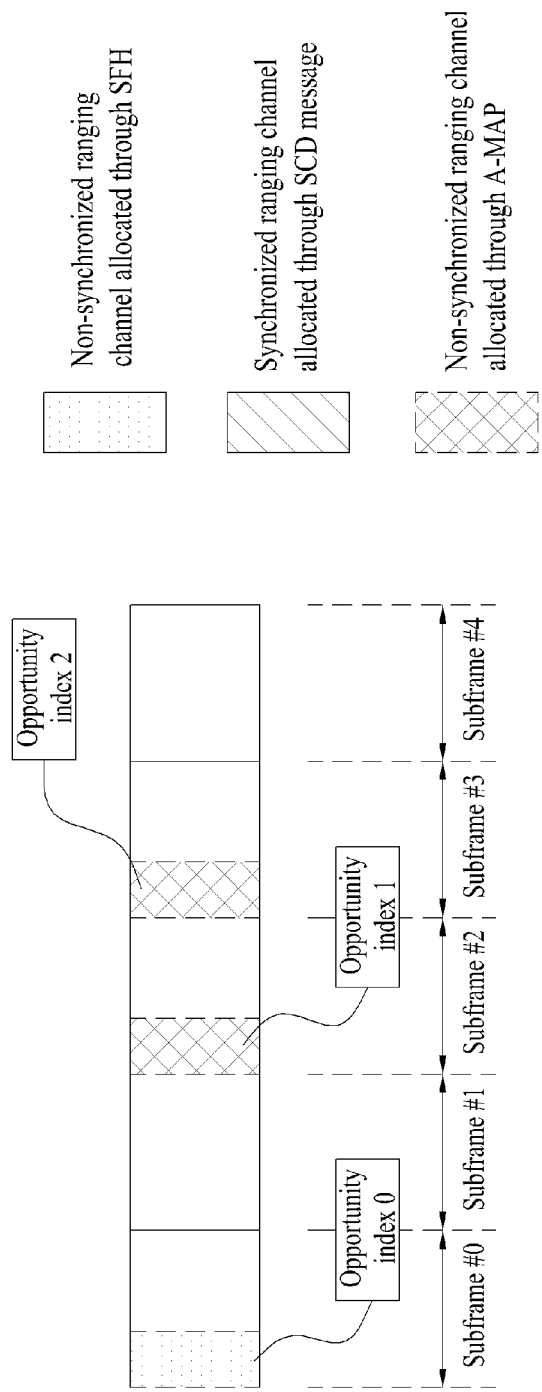
FIG. 4 is a diagram illustrating still another example of a mapping rule for mapping ranging channels into opportunity indexes in accordance with one embodiment of the present invention.

FIG. 4 is a diagram illustrating still another example of a mapping rule for mapping ranging channels into opportunity indexes in accordance with one embodiment of the present invention.

In FIG. 4, it is assumed that a downlink/uplink (DL/UL) ratio is 3:5 and ranging opportunity index has a size of 2 bits (i.e., four of 0~3). Also, it is assumed that the first value (i.e., 0) of the opportunity index is given to the NS-RCH. Moreover, it is assumed that maximum one ranging channel exists in one subframe. However, it is assumed that the synchronized ranging channel is not allocated through the AAI_SCD message at this frame.

Referring to FIG. 4, one ranging channel is allocated to each of the subframes #0, 2 and #3. At this time, the non-synchronized ranging channel (NS-RCH) transmitted through the SFH is located at the subframe #0. As the mapping rule according to this embodiment is applied to the corresponding base station, regardless that the corresponding ranging channel is located at first on the time axis, the ranging opportunity index becomes 0.

As a result, the remaining opportunity indexes are 1 to 3, and the indexes of the NS-RCHs allocated through the A-MAP are given in such a manner that the index 1 is given to the ranging channel of the subframe #2 and the index 2 is given to the ranging channel of the subframe #3 in the order on the time axis.

Another example that the mapping rule according to this embodiment is applied to the type 3 base station will be described with reference to FIG. 5.

Figure 5:
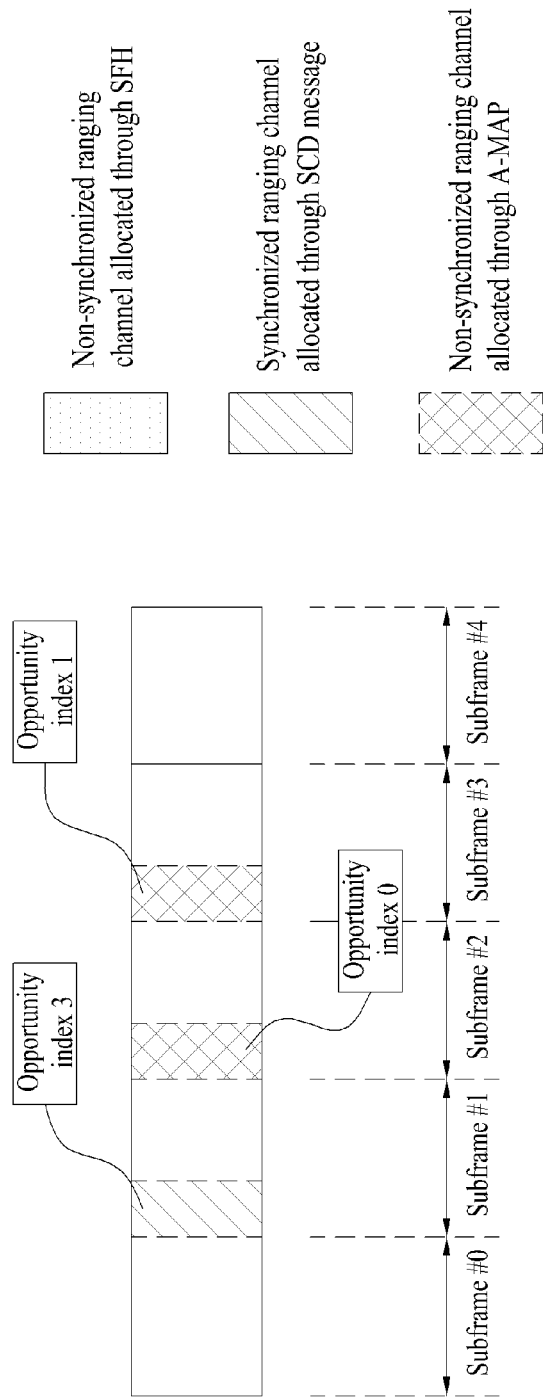
FIG. 5 is a diagram illustrating further still another example of a mapping rule for mapping ranging channels into opportunity indexes in accordance with one embodiment of the present invention.

FIG. 5 is a diagram illustrating further still another example of a mapping rule for mapping ranging channels into opportunity indexes in accordance with one embodiment of the present invention.

In FIG. 5, it is assumed that a downlink/uplink (DL/UL) ratio is 3:5 and ranging opportunity index has a size of 2 bits (i.e., four of 0~3). Also, it is assumed that the last value (i.e., 3) of the opportunity index is given to the S-RCH. Moreover, it is assumed that maximum one ranging channel exists in one subframe. However, it is assumed that the non-synchronized ranging channel is not allocated through the SFH at this frame.

Referring to FIG. 5, the synchronized ranging channel (S-RCH) allocated through the AAI_SCD message is located at the subframe #1 but is given the last index 3 in accordance with the mapping rule according to this embodiment.

As a result, the remaining opportunity indexes are 1 and 2, and the indexes of the NS-RCHs allocated through the A-MAP are given in such a manner that the index 0 is given to the ranging channel of the subframe #2 and the index 1 is given to the ranging channel of the subframe #3 in the order on the time axis.

In the mean time, even though there is no NS-RCH allocated through the SFH within the corresponding frame, the first value (i.e., 0) of the ranging opportunity index given to the NS-RCH may be reserved. In this case, the opportunity indexes remaining for the NS-RCHs allocated through the A-MAP are 1 and 2, and the indexes of the NS-RCHs allocated through the A-MAP are given in such a manner that the index 1 is given to the ranging channel of the subframe #2 and the index 2 is given to the ranging channel of the subframe #3 in the order on the time axis.

Another example that the mapping rule according to this embodiment is applied to the type 3 base station will be described with reference to FIG. 6.

Figure 6:
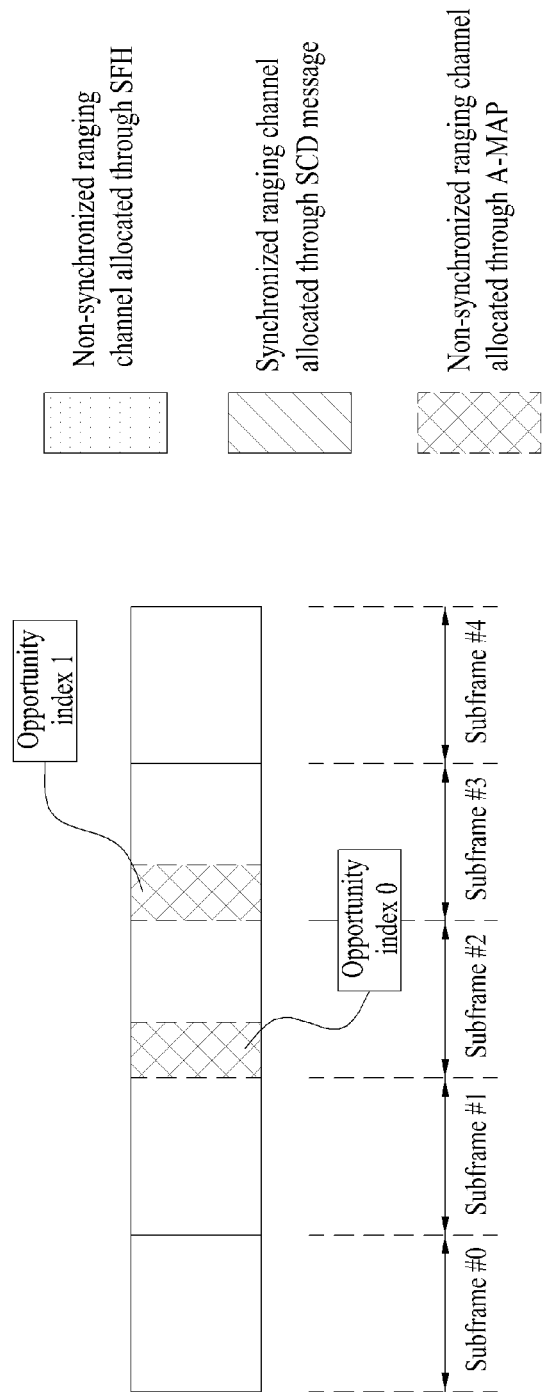
FIG. 6 is a diagram illustrating further still another example of a mapping rule for mapping ranging channels into opportunity indexes in accordance with one embodiment of the present invention.

FIG. 6 is a diagram illustrating further still another example of a mapping rule for mapping ranging channels into opportunity indexes in accordance with one embodiment of the present invention.

In FIG. 6, it is assumed that a downlink/uplink (DL/UL) ratio is 3:5 and ranging opportunity index has a size of 2 bits (i.e., four of 0~3). Also, it is assumed that the last value (i.e., 3) of the opportunity index is given to the S-RCH. Moreover, it is assumed that maximum one ranging channel exists in one subframe. However, it is assumed that the non-synchronized ranging channel through the SFH and the synchronized ranging channel through the AAI_SCD message are not allocated at this frame.

Referring to FIG. 6, since no ranging channel (S-RCH) allocated through the SFH and the AAI_SCD message exists, the remaining opportunity indexes are 0 to 3, and the indexes of the NS-RCHs allocated through the A-MAP are given in such a manner that the index 0 is given to the ranging channel of the subframe #2 and the index 1 is given to the ranging channel of the subframe #3 in the order on the time axis.

In the mean time, even though there is no NS-RCH allocated through the SFH within the corresponding frame, the first value (i.e., 0) of the ranging opportunity index given to the NS-RCH may be reserved. Also, the last value (i.e., 3) of the ranging opportunity index given to the S-RCH allocated through the AAI_SCD message may be reserved. In this case, the opportunity indexes remaining for the NS-RCHs allocated through the A-MAP are 1 and 2, and the indexes of the NS-RCHs allocated through the A-MAP are given in such a manner that the index 1 is given to the ranging channel of the subframe #2 and the index 2 is given to the ranging channel of the subframe #3 in the order on the time axis.

Application to Type 2 Base Station

Hereinafter, other example that the mapping rule according to this embodiment is applied to the type 2 base station will be described with reference to FIG. 7.

Figure 7:
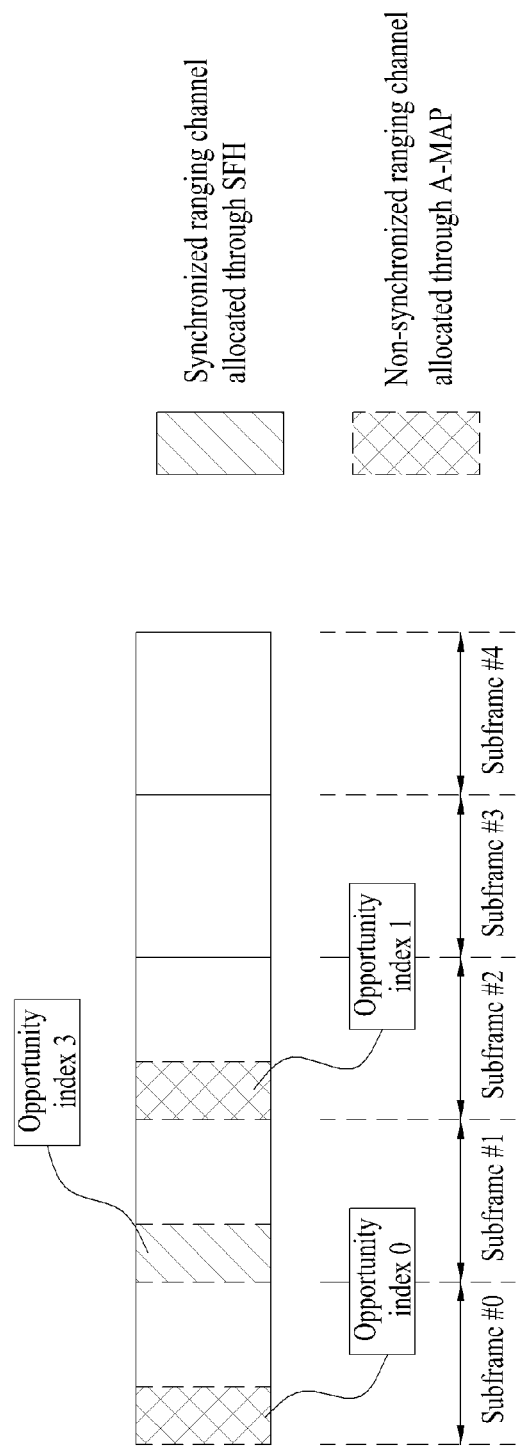
FIG. 7 is a diagram illustrating an example of a mapping rule for mapping ranging channels into opportunity indexes in a base station having narrow coverage in accordance with one embodiment of the present invention.

FIG. 7 is a diagram illustrating an example of a mapping rule for mapping ranging channels into opportunity indexes in a base station having narrow coverage in accordance with one embodiment of the present invention.

In FIG. 7, it is assumed that a downlink/uplink (DL/UL) ratio is 3:5 and ranging opportunity index has a size of 2 bits (i.e., four of 0~3). Also, it is assumed that the S-RCH is only allocated in the base station having narrow coverage such as a femto cell. Accordingly, it is assumed that the last value (i.e., 3) of the opportunity index is given to the S-RCH allocated through the SFH. Moreover, it is assumed that maximum one ranging channel exists in one subframe.

Referring to FIG. 7, the synchronized ranging channel (S-RCH) allocated through the SFH is located at the subframe #1. As the mapping rule according to this embodiment is applied to the corresponding base station, regardless of the location on the time axis of the corresponding ranging channel, the ranging opportunity index becomes 3.

As a result, the remaining opportunity indexes are 0 to 2, and the indexes of the S-RCHs allocated through the A-MAP are given in such a manner that the index 0 is given to the ranging channel of the subframe #0 and the index 1 is given to the ranging channel of the subframe #2 in the order on the time axis.

Application to Type 1 Base Station

Hereinafter, other example that the mapping rule according to this embodiment is applied to the type 1 base station will be described with reference to FIG. 8 and FIG. 9.

Figure 8:
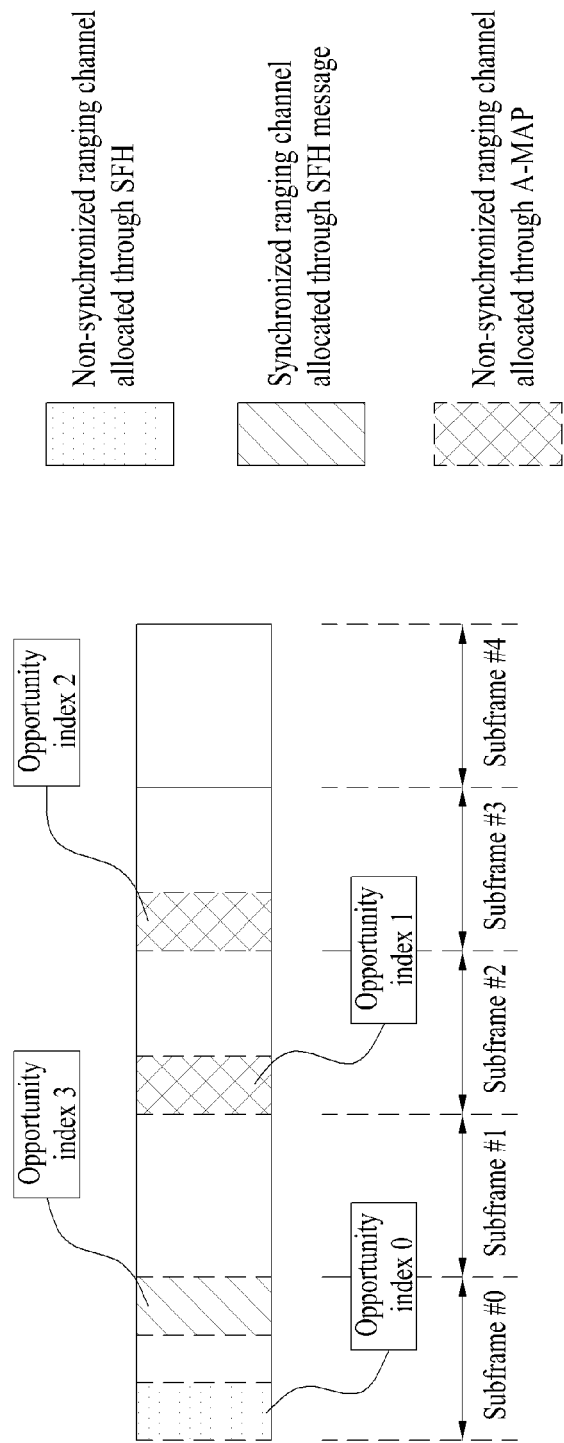
FIG. 8 is a diagram illustrating an example of a mapping rule for mapping ranging channels into opportunity indexes in a base station, which supports a legacy system, in accordance with one embodiment of the present invention.

FIG. 8 is a diagram illustrating an example of a mapping rule for mapping ranging channels into opportunity indexes in a base station, which supports a legacy system, in accordance with one embodiment of the present invention.

In FIG. 8, it is assumed that a downlink/uplink (DL/UL) ratio is 3:5 and ranging opportunity index has a size of 2 bits (i.e., four of 0~3). Also, it is assumed that the first value (i.e., 0) of the opportunity index is given to the NS-RCH. Moreover, it is assumed that the NS-RCH except for the NS-RCH dynamically allocated through the A-MAP (or AAI_HO-CMD message) and the S-RCH exist together in one subframe to support the legacy system.

Referring to FIG. 8, regardless that the non-synchronized ranging channel (NS-RCH) allocated through the SFH is located at the subframe #0, the first opportunity index 0 is given to the NS-RCH in accordance with the mapping rule according to this embodiment. Also, the opportunity index 3 is given to the synchronized ranging channel allocated through the SFH at the same subframe.

As a result, the remaining opportunity indexes are 1 and 2, and the indexes of the NS-RCHs allocated through the A-MAP are given in such a manner that the index 1 is given to the ranging channel of the subframe #2 and the index 2 is given to the ranging channel of the subframe #3 in the order on the time axis.

Figure 9:
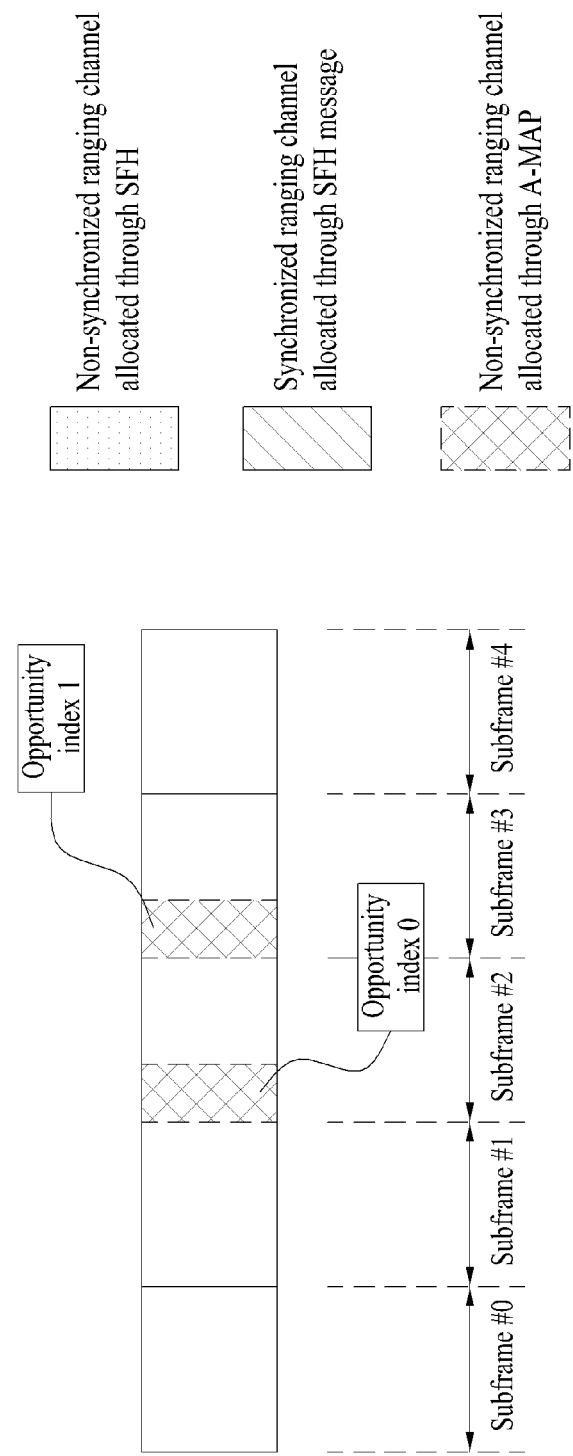
FIG. 9 is a diagram illustrating another example of a mapping rule for mapping ranging channels into opportunity indexes in a base station, which supports a legacy system, in accordance with one embodiment of the present invention.

FIG. 9 is a diagram illustrating another example of a mapping rule for mapping ranging channels into opportunity indexes in a base station, which supports a legacy system, in accordance with one embodiment of the present invention.

In FIG. 9, it is assumed that a downlink/uplink (DL/UL) ratio is 3:5 and ranging opportunity index has a size of 2 bits (i.e., four of 0~3). Also, it is assumed that the first value (i.e., 0) of the opportunity index is given to the NS-RCH. However, it is assumed that the RCH is not allocated through the SFH at the corresponding frame.

Referring to FIG. 9, since no RCH allocated through the SFH exists as above, opportunity indexes 0 and 1 are given to the NS-RCH allocated through the A-MAP, in due order.

In the mean time, even though there is no RCH allocated through the SFH within the corresponding frame, the first value (i.e., 0) and/or the last value (i.e., 3) of the ranging opportunity index given to the RCH may be reserved. In this case, the opportunity indexes remaining for the NS-RCHs allocated through the A-MAP are 1 and 2, and the indexes of the NS-RCHs allocated through the A-MAP are given in such a manner that the index 1 is given to the ranging channel of the subframe #2 and the index 2 is given to the ranging channel of the subframe #3 in the order on the time axis.

Second Embodiment

According to another embodiment of the present invention, opportunity indexes of the ranging channels are given in due order in a subframe unit in accordance with time/frequency axes, and subframe numbers of the ranging channels are explicitly notified to the mobile station.

An example that the mapping rule of the ranging opportunity index according to this embodiment is applied to the type 1 base station (i.e., base station that supports WirelessMAN-OFDMA with FDM-based UL PUSC zone) will be described with reference to FIG. 10.

Figure 10:
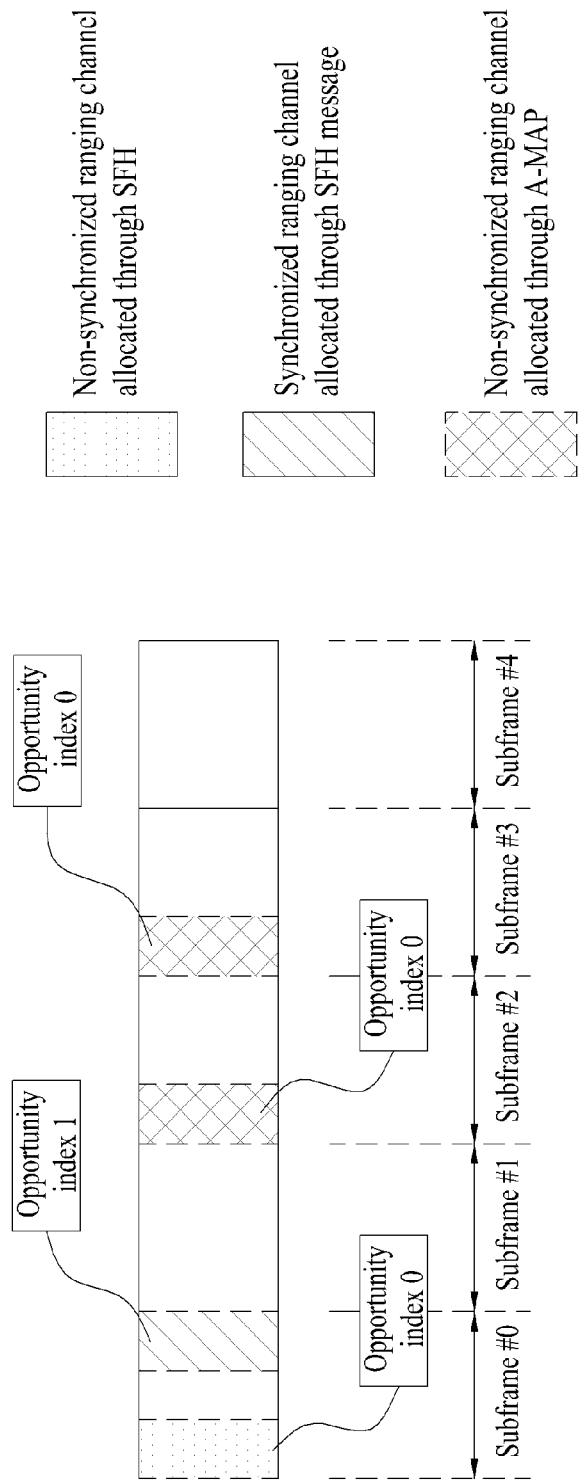
FIG. 10 is a diagram illustrating an example of a mapping rule for mapping ranging channels into opportunity indexes in accordance with another embodiment of the present invention.

In FIG. 10, it is assumed that a downlink/uplink (DL/UL) ratio is 3:5 and ranging opportunity index has a size of 2 bits (i.e., four of 0~3). Also, it is assumed that the NS-RCH except for the NS-RCH dynamically allocated through the A-MAP and the S-RCH exist together in one subframe to support the legacy system.

Referring to FIG. 10, the non-synchronized ranging channel (NS-RCH) and the S-RCH allocated through the SFH exist together at the subframe #0, and the ranging opportunity indexes are given in a subframe unit in the order of the time axis. Accordingly, the opportunity index 0 is given to the NS-RCH while the opportunity index 1 is given to the S-RCH. Also, since the other NS-RCHs allocated through the A-MAP exist, respectively, at each of the subframes #2 and #3, the two NS-RCHs become 0.

For implementation of this embodiment, it is preferable that a field for indicating a subframe number per RCH is additionally provided to the ranging channel allocation information of the SFH, AAI_SCD and A-MAP. It is also preferable that a field for indicating a subframe number to which the ranging opportunity index belongs is additionally provided to the ranging acknowledgement (AAI_RNG-ACK) message and the CDMA allocation A-MAP.

Third Embodiment

According to still another embodiment of the present invention, ranging opportunity indexes are given in due order in the order of time axis and frequency axis of the corresponding channel depending on usage (i.e., whether NS-RCH or S-RCH) of the ranging channel.

In other words, the opportunity indexes are basically given to the NS-RCH in the same method as that of one embodiment of the present invention, and the same opportunity index values as those of the NS-RCH are given to the S-RCH. To this end, it is preferable that ranging channel allocation information transmitted through the SFH or the A-MAP explicitly includes ranging type information (i.e., whether NS-RCH or S-RCH).

It is also preferable that the ranging acknowledgement response (AAI_RNG-ACK) message and the CDMA allocation A-MAP explicitly include ranging type information of the ranging opportunity index.

Hereinafter, an example that the mapping rule of the ranging opportunity index according to this embodiment is applied to the type 1 base station (i.e., base station that supports WirelessMAN-OFDMA with FDM-based UL PUSC zone) will be described with reference to FIG. 11.

Figure 11:
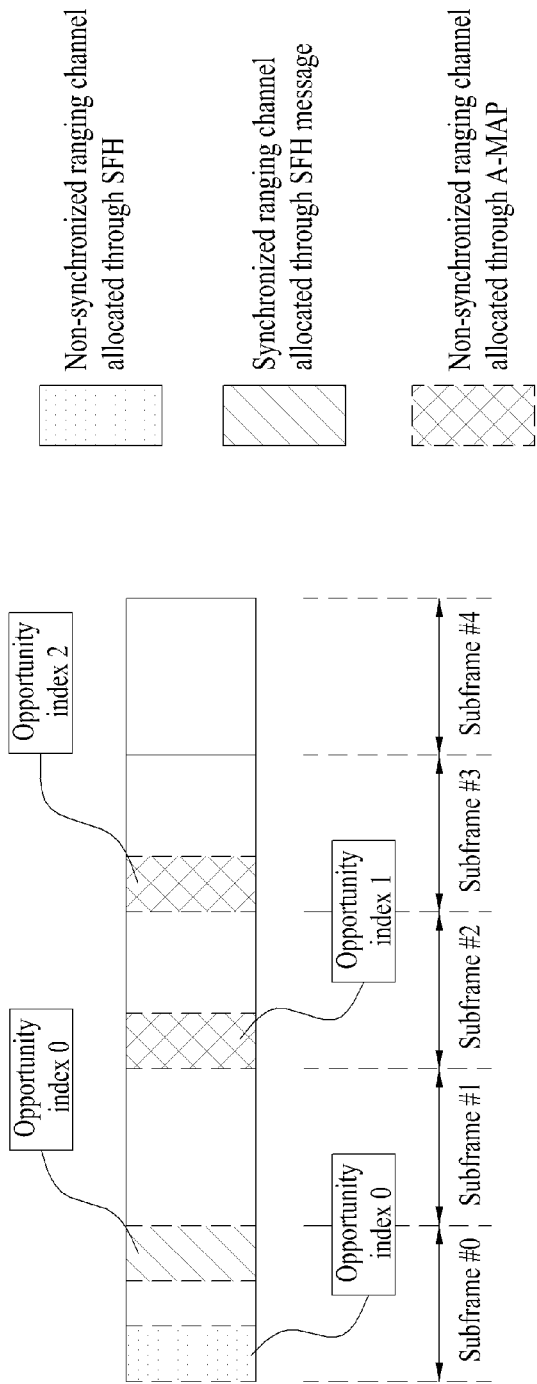
FIG. 11 is a diagram illustrating an example of a mapping rule for mapping ranging channels into opportunity indexes in accordance with still another embodiment of the present invention.

FIG. 11 is a diagram illustrating an example of a mapping rule for mapping ranging channels into opportunity indexes in accordance with still another embodiment of the present invention.

In FIG. 11, it is assumed that a downlink/uplink (DL/UL) ratio is 3:5 and ranging opportunity index has a size of 2 bits (i.e., four of 0~3). Also, it is assumed that the NS-RCH except for the NS-RCH dynamically allocated through the A-MAP and the S-RCH exist together in one subframe to support the legacy system.

Referring to FIG. 11, the non-synchronized ranging channel (NS-RCH) and the S-RCH allocated through the SFH exist together at the subframe #0. Since the NS-RCH is located at first on the time axis of the corresponding frame, the ranging opportunity index becomes 0. Since the S-RCH is also located at first on the time axis of the corresponding frame, the ranging opportunity index becomes 0.

First of all, since one NS-RCH (ranging opportunity index 0) exists at the subframe #0, the opportunity index 1 and the opportunity index 2 are respectively given to the other two NS-RCHs allocated through the A-MAP, in the order of the time axis.

Fourth Embodiment

According to still another embodiment of the present invention, ranging channels are mapped into fixed values of opportunity indexes depending on a transmission mode of ranging channel allocation information.

In more detail, when ranging channels are allocated to one frame through the S-SFH SP1, opportunity indexes starting from 0 are mapped into the respective ranging channels allocated through the S-SFH. At this time, the mapping order of the ranging opportunity indexes are the same as the allocation order of the ranging channels through the S-SFH SP1 on the time axis. Also, when a ranging channel is allocated to one frame through the AAI_SCD message, the corresponding ranging channel is mapped into the opportunity index 3. Afterwards, the other ranging opportunity indexes are given to the ranging channels allocated through the A-MAP IE, and the mapping order of the opportunity indexes into the respective ranging channels are the same as the allocation order of the ranging channels through the A-MAP IE on the time axis.

An example that the mapping rule according to this embodiment is applied to the type 3 base station will be described with reference to FIG. 12.

Figure 12:
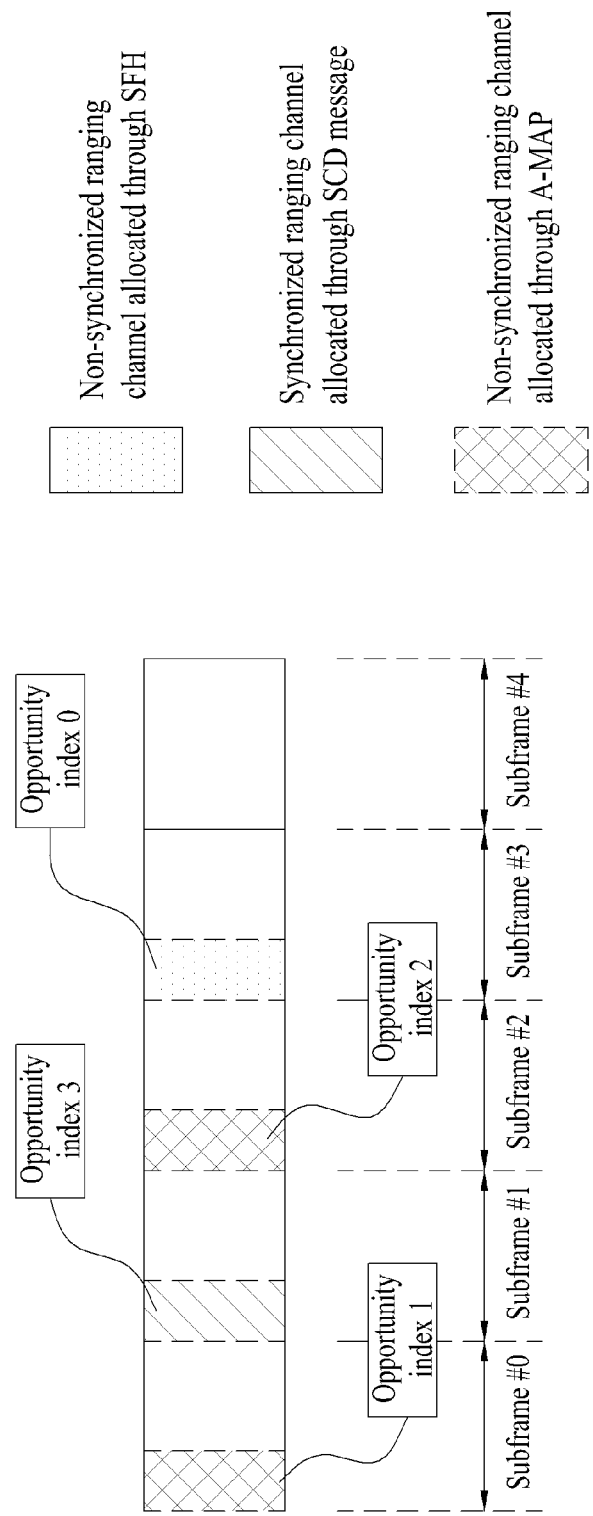
FIG. 12 is a diagram illustrating an example of a mapping rule for mapping ranging channels into opportunity indexes in accordance with further still another embodiment of the present invention.

FIG. 12 is a diagram illustrating an example of a mapping rule for mapping ranging channels into opportunity indexes in accordance with further still another embodiment of the present invention.

In FIG. 12, it is assumed that a downlink/uplink (DL/UL) ratio is 3:5 and ranging opportunity index has a size of 2 bits (i.e., four of 0~3). Also, it is assumed that maximum one ranging channel exists in one subframe.

Referring to FIG. 12, one ranging channel is allocated to each of subframes #0 to #3. At this time, the non-synchronized ranging channel (NS-RCH) allocated through the SFH is located at the subframe #3. As the mapping rule according to this embodiment is applied to the corresponding base station, even though the corresponding ranging channel is not located at first on the time axis, the ranging opportunity index becomes 0.

Next, the synchronized ranging channel (S-RCH) allocated through the AAI_SCD message is located at the subframe #1 but is given the last index 3 in accordance with the mapping rule according to this embodiment.

As a result, the remaining opportunity indexes are 1 and 2, and the indexes of the NS-RCHs allocated through the A-MAP are given in such a manner that the index 1 is given to the ranging channel of the subframe #0 and the index 2 is given to the ranging channel of the subframe #2 in the order on the time axis.

Next, an example that the mapping rule according to this embodiment is applied to the type 1 base station will be described with reference to FIG. 13.

Figure 13:
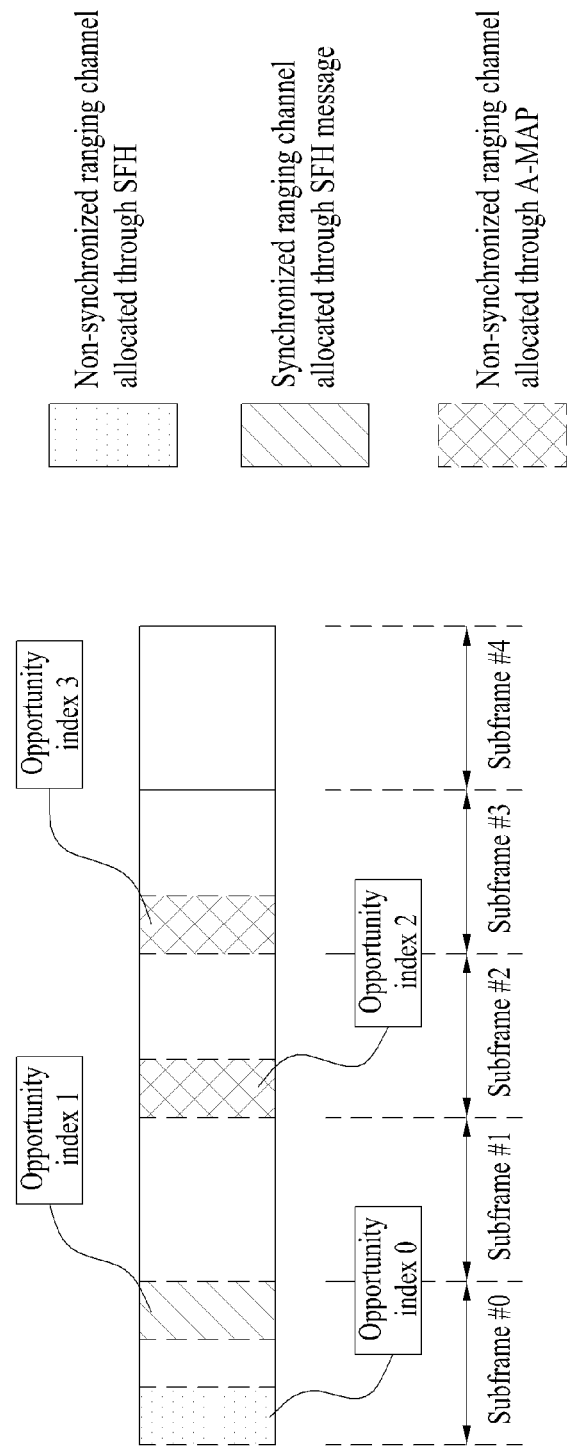
FIG. 13 is a diagram illustrating an example of a mapping rule for mapping ranging channels into opportunity indexes in a base station, which supports a legacy system, in accordance with another embodiment of the present invention.

FIG. 13 is a diagram illustrating an example of a mapping rule for mapping ranging channels into opportunity indexes in a base station, which supports a legacy system, in accordance with further still another embodiment of the present invention.

In FIG. 13, it is assumed that a downlink/uplink (DL/UL) ratio is 3:5 and ranging opportunity index has a size of 2 bits (i.e., four of 0~3). Also, it is assumed that the NS-RCH except for the NS-RCH dynamically allocated through the A-MAP and the S-RCH exist together in one subframe to support the legacy system.

Referring to FIG. 13, the non-synchronized ranging channel (NS-RCH) and the S-RCH allocated through the SFH are located at the subframe #0. The RCHs allocated through the same channel (in this case, SFH) are given opportunity indexes depending on the time axis. In this case, the opportunity index 0 is given to the NS-RCH located first on the time axis while the opportunity index 1 is given to the S-RCH.

As a result, the remaining opportunity indexes are 2 and 3, and the indexes of the NS-RCHs allocated through the A-MAP are given in such a manner that the index 2 is given to the ranging channel of the subframe #2 and the index 3 is given to the ranging channel of the subframe #3 in the order on the time axis.

Hereinafter, another example that the mapping rule according to this embodiment is applied to the type 2 base station will be described with reference to FIG. 14.

Figure 14:
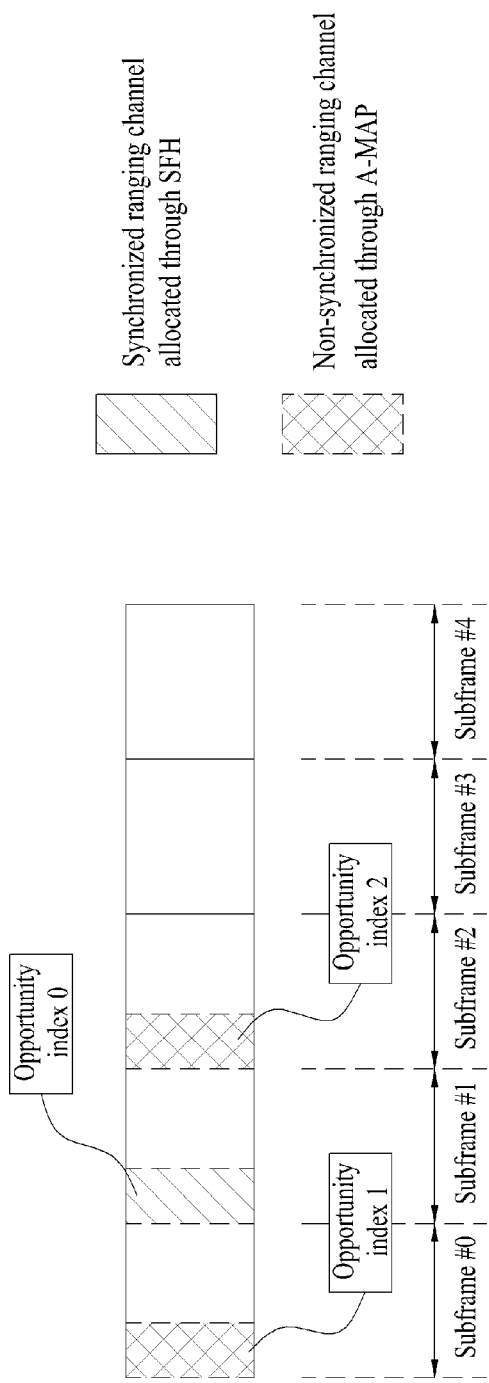
FIG. 14 is a diagram illustrating an example of a mapping rule for mapping ranging channels into opportunity indexes in a base station having narrow coverage in accordance with another embodiment of the present invention.

FIG. 14 is a diagram illustrating an example of a mapping rule for mapping ranging channels into opportunity indexes in a base station having narrow coverage in accordance with further still another embodiment of the present invention.

In FIG. 14, it is assumed that a downlink/uplink (DL/UL) ratio is 3:5 and ranging opportunity index has a size of 2 bits (i.e., four of 0~3). Also, it is assumed that maximum one ranging channel exists in one subframe.

Referring to FIG. 14, the synchronized ranging channel (S-RCH) transmitted through the SFH is located at the subframe #1. As the mapping rule according to this embodiment is applied to the corresponding base station, regardless of the location on the time axis of the corresponding ranging channel, the ranging opportunity index becomes 0.

As a result, the remaining opportunity indexes are 1 to 3, and the indexes of the S-RCHs allocated through the A-MAP are given in such a manner that the index 1 is given to the ranging channel of the subframe #0 and the index 2 is given to the ranging channel of the subframe #2 in the order on the time axis.

In the aforementioned embodiments, the ranging channels dynamically allocated through the A-MAP may be allocated through the handover command (AAI_HO-CMD) message during the handover procedure.

Configuration of Mobile Station and Base Station

Hereinafter, as another embodiment of the present invention, a mobile station and a base station (FBS or MBS) through which the embodiments of the present invention can be carried out will be described.

The mobile station is operated as a transmitter in an uplink, whereas it is operated as a receiver in a downlink. Also, the base station is operated as a receiver in the uplink, whereas it is operated as a transmitter in the downlink. In other words, each of the mobile station and the base station can include a transmitter and a receiver for transmission and reception of information or data.

The transmitter and the receiver can include a processor, a module, a part, and/or a means, for which the embodiments of the present invention are carried out. In particular, the transmitter and the receiver can include a module (means) for encoding messages, a module for decoding the encoded messages, and an antenna for transmitting and receiving messages. An example of the transmitter and the receiver will be described with reference to FIG. 15.

Figure 15:
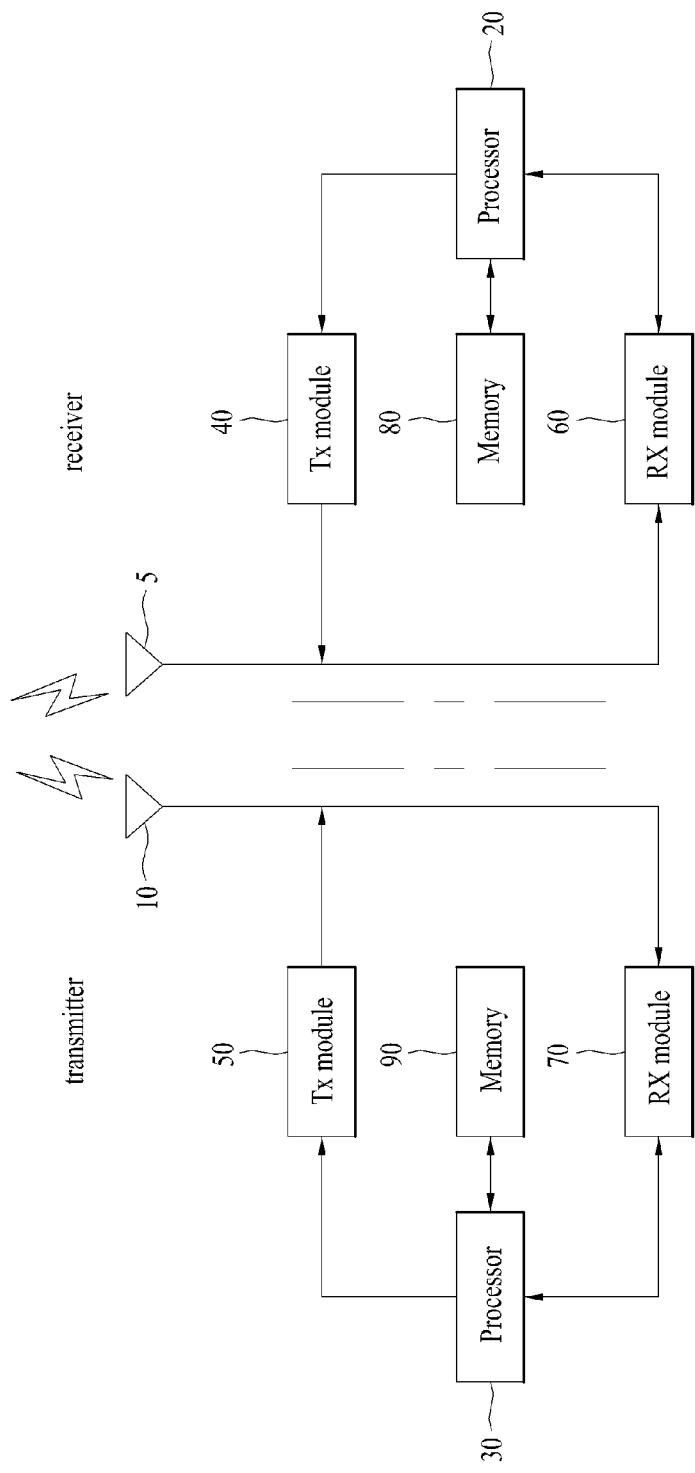
FIG. 15 is a block diagram illustrating an example of a transmitter and a receiver in accordance with another embodiment of the present invention.

FIG. 15 is a block diagram illustrating an example of a transmitter and a receiver according to another embodiment of the present invention.

Referring to FIG. 15, the left side represents a structure of the transmitter while the right side represents a structure of the receiver. Each of the transmitter and the receiver can include an antenna 5, 10, a processor 20, 30, a Tx module 40, 50, an Rx module 60, 70, and a memory 80, 90. The respective elements can perform functions corresponding to those of counterparts. Hereinafter, the respective elements will be described in more detail.

The antenna 5, 10 serves to transmit a signal generated by the Tx module 40, 50 to the outside or receive a radio signal from the outside to transfer the radio signal to the Rx module 60, 70. If a MIMO function is supported, two or more antennas may be provided.

The antenna, the Tx module, and the Rx module can constitute a radio frequency (RF) module.

The processor 20, 30 generally controls the whole operation of the mobile station. For example, the processor 20, 30 can perform a controller function for performing the aforementioned embodiments of the present invention, a medium access control (MAC) frame variable control function according to service characteristics and radio wave condition, a handover function, an authentication and encryption function, etc. In more detail, the processor 20, 30 can perform the whole control for performing the aforementioned procedure of transmitting/updating system information.

Particularly, the processor of the mobile station controls a radio communication module to receive the SFH, AAI_SCD message and/or A-MAP, which includes allocation information of the ranging channels. The processor of the mobile station, which has acquired the allocation information of the ranging channels, selects a ranging code for its desired ranging, and controls the radio communication module to transmit the selected code to the ranging channel indicated by the allocation information of the ranging channels. Afterwards, the mobile station can identify the received result of the selected ranging code through the AAI_RNG-ACK message received from the base station. During the aforementioned ranging procedure, the processor of the mobile station can determine opportunity index of the corresponding ranging channel through any one of the aforementioned embodiments to identify the ranging channel through which the ranging code has been transmitted.

In addition, the processor of the mobile station can perform the whole control operation of processes disclosed in the aforementioned embodiments.

The Tx module 40, 50 performs predetermined coding and modulation for data, which are scheduled from the processor 20, 30 and then transmitted to the outside, and then transfers the coded and modulated data to the antenna 10.

The Rx module 60, 70 performs decoding and demodulation for the radio signal received from the outside through the antenna 5, 10 to recover original data and then transfer the recovered data to the processor 20, 30.

The memory 80, 90 may store a program for processing and control of the processor 20, 30, or may perform a function for temporarily storing input/output data (ESI information, etc.). Also, the memory 80, 90 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the mean time, the base station and the mobile station perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or further include a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for performing ranging at a mobile station in a broadband wireless access system, the method comprising:
receiving allocation information of at least one first ranging channel allocated to a specific frame, from a base station;
determining an opportunity index of the first ranging channel by using the allocation information;
receiving allocation information of at least one second ranging channel, which is dynamically allocated, from the base station; and
determining an opportunity index of the second ranging channel,
wherein, if the first ranging channel is a non-synchronized ranging channel (NS-RCH), the determination of the opportunity index of the first ranging channel is performed to determine an opportunity index of the non-synchronized ranging channel as an initial value of an opportunity index range which is previously set, and
if the first ranging channel is a synchronized ranging channel (S-RCH), the determination of the opportunity index of the first ranging channel is performed to determine an opportunity index of the synchronized ranging channel as the last value of the opportunity index range, and
wherein the determination of the opportunity index of the second ranging channel is performed by mapping each of the at least one second ranging channel into one of remaining opportunity indices in the opportunity index range except for the initial value and the last value, and
wherein the allocation information of the at least one first ranging channel is received through a super frame header (SFH) if the first ranging channel is the non-synchronized ranging channel and received through the super frame header or a system configuration descriptor (AAI_SCD) message if the first ranging channel is the synchronized ranging channel, and the allocation information of the at least one second ranging channel is received through a map (A-MAP) or handover command (AAI_HO-CMD) message.

2. The method as claimed in claim 1, wherein an order of the mapping is the same as an allocation order of the at least one second ranging channel on the allocation information on a time domain.

3. The method as claimed in claim 2, further comprising:
transmitting a ranging code to the base station through a ranging channel selected from the ranging channels; and
determining a ranging result of the ranging code by using the opportunity index of the selected ranging channel, through which the ranging code has been transmitted, and a ranging acknowledgement (AAI_RNG-ACK) message received from the base station.

4. The method as claimed in claim 1, further comprising:
transmitting a ranging code to the base station through a ranging channel selected from the ranging channels; and
determining a ranging result of the ranging code by using the opportunity index of the selected ranging channel, through which the ranging code has been transmitted, and a ranging acknowledgement (AAI_RNG-ACK) message received from the base station.

5. The method as claimed in claim 1, wherein the opportunity index of the non-synchronized ranging channel is 0b00, and the opportunity index of the synchronized ranging channel is 0b11.

6. A method for performing ranging at a base station in a broadband wireless access system, the method comprising:
transmitting allocation information of at least one of at least one first ranging channel allocated to a specific frame and at least one second ranging channel dynamically allocated, to a mobile station;
receiving a ranging code from the mobile station through any one of the first ranging channel and the second ranging channel; and
transmitting a ranging acknowledgement (AAI_RNG-ACK) message, which includes a ranging status of the ranging code and an opportunity index indicating the ranging channel through which the ranging code has been received, to the mobile station,
wherein if one of the at least one first ranging channel is a non-synchronized ranging channel (NS-RCH), the first ranging channel is mapped into an initial value of an opportunity index range which is previously set, wherein if one of the at least one first ranging channel is a synchronized ranging channel (S-RCH), the first ranging channel is mapped into the last value of the opportunity index range, wherein each of the at least one second ranging channel is mapped into one of remaining opportunity indices in the opportunity index range except for the initial value and the last value, and wherein the allocation information of the at least one first ranging channel is transmitted through a super frame header (SFH) if the first ranging channel is the non-synchronized ranging channel and transmitted through the super frame header or a system configuration descriptor (AAI_SCD) message if the first ranging channel is the synchronized ranging channel, and the allocation information of the at least one second ranging channel is transmitted through a map (A-MAP) or handover command (AAI_HO-CMD) message.

7. The method as claimed in claim 6, wherein an order of the mapping of each of the at least one second ranging channel is the same as an allocation order of the at least one second ranging channel on the allocation information on a time domain.

8. The method as claimed in claim 6, wherein the opportunity index of the non-synchronized ranging channel is 0b00, and the opportunity index of the synchronized ranging channel is 0b11.

9. A mobile station that performs a ranging procedure in a broadband wireless access system, the mobile station comprising:
a processor; and
a radio frequency (RF) module transmitting and receiving a radio signal to and from the outside under the control of the processor,
wherein, if allocation information of at least one first ranging channel allocated to a specific frame is received from a base station, the processor determines an opportunity index of the at least one first ranging channel by using the allocation information, and if allocation information of at least one second ranging channel, which is dynamically allocated, is received from the base station, the processor determines an opportunity index of the second ranging channel,
wherein if the at least one first ranging channel is a non-synchronized ranging channel (NS-RCH), the processor determines an opportunity index of the non-synchronized ranging channel as an initial value of an opportunity index range which is previously set, and if the first ranging channel is a synchronized ranging channel (S-RCH), the processor determines an opportunity index of the synchronized ranging channel as the last value of the opportunity index range, wherein the determination of the opportunity index of the second ranging channel is performed by mapping each of the at least one second ranging channel into one of remaining opportunity indices in the opportunity index range except for the initial value and the last value, and wherein the allocation information of the at least one first ranging channel is received through a super frame header (SFH) if the first ranging channel is the non-synchronized ranging channel and received through the super frame header or a system configuration descriptor (AAI_SCD) message if the first ranging channel is the synchronized ranging channel, and the allocation information of the at least one second ranging channel is received through a map (A-MAP) or handover command (AAI_HO-CMD) message.

10. The mobile station as claimed in claim 9, wherein an order of the mapping is the same as an allocation order of the at least one second ranging channel on the allocation information on a time domain.

11. The mobile station as claimed in claim 10, wherein the processor transmits a ranging code to the base station through a ranging channel selected from the ranging channels, and determines a ranging result of the ranging code by using the opportunity index of the selected ranging channel, through which the ranging code has been transmitted, and a ranging acknowledgement (AAI_RNG-ACK) message received from the base station.

12. The mobile station as claimed in claim 9, wherein the processor transmits a ranging code to the base station through a selected ranging channel from the ranging channels, and determines a ranging result of the ranging code by using the opportunity index of the selected ranging channel, through which the ranging code has been transmitted, and a ranging acknowledgement (AAI_RNG-ACK) message received from the base station.

13. The mobile station as claimed in claim 9, wherein the opportunity index of the non-synchronized ranging channel is 0b00, and the opportunity index of the synchronized ranging channel is 0b11.

* * * * *